United States Patent
Chakra et al.

(10) Patent No.: US 11,907,220 B2
(45) Date of Patent: *Feb. 20, 2024

(54) OPTIMIZING QUERY PROCESSING AND ROUTING IN A HYBRID WORKLOAD OPTIMIZED DATABASE SYSTEM

(71) Applicant: International Business Machines Corporation, Armonk, NY (US)

(72) Inventors: Al Chakra, Apex, NC (US); Ruiping Li, San Jose, CA (US); Terence P. Purcell, Springfield, IL (US); Lily Zhou, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/126,427

(22) Filed: Dec. 18, 2020

(65) Prior Publication Data

US 2021/0191943 A1 Jun. 24, 2021

Related U.S. Application Data (63) Continuation of application No. 15/899,694, filed on Feb. 20, 2018, now Pat. No. 10,909,116.

(51) Int. Cl.
  *G06F 16/00* (2019.01)
  *G06F 16/2453* (2019.01)
  *G06F 16/23* (2019.01)

(52) U.S. Cl.
  CPC .... *G06F 16/24545* (2019.01); *G06F 16/2379* (2019.01); *G06F 16/24537* (2019.01)

(58) Field of Classification Search
  CPC ............. G06F 16/2454; G06F 16/2379; G06F 16/24537; G06F 16/24545; G06F 16/24549
  See application file for complete search history.

(56) References Cited

U.S. PATENT DOCUMENTS 6,263,345 B1   7/2001  Farrar et al.
6,938,035 B2 *  8/2005  Driesch, Jr. ....... G06F 16/24545
(Continued)

FOREIGN PATENT DOCUMENTS

CN      102906743 A  *  1/2013  ............ G06F 16/28

OTHER PUBLICATIONS

List of IBM Patents or Patent Applications Treated as Related, Jan. 12, 2021, pp. 1-2.

(Continued)

*Primary Examiner* — Leslie Wong
(74) *Attorney, Agent, or Firm* — Shackelford, Bowen, McKinley & Norton, LLP; Robert A. Voigt, Jr.

(57) ABSTRACT

A method, system and computer program product for processing queries in a hybrid database system. A database management system of the hybrid database system obtains an estimated execution time of a query by an online transaction processing engine. The database management system further obtains an estimated execution time of the query by a database accelerator. Furthermore, the database management system determines a wait time (which could be zero) for the database accelerator to process the query. The database management system then determines whether the online transaction processing engine or the database accelerator will process the query using the estimated execution time of the query by the online transaction processing engine, the estimated execution time of the query by the database accelerator and the wait time (which could be zero) for the database accelerator to process the query. In this manner, the processing of queries in hybrid database systems is optimized.

18 Claims, 6 Drawing Sheets

(56) References Cited

U.S. PATENT DOCUMENTS

| | | | |
|---|---|---|---|
| 7,599,969 | B2 | 10/2009 | Mignet et al. |
| 8,170,981 | B1* | 5/2012 | Tewksbary .............. G06F 16/25 |
| | | | 707/600 |
| 8,447,754 | B2 | 5/2013 | Weissman et al. |
| 8,566,307 | B2* | 10/2013 | Denton ................. G06F 16/217 |
| | | | 707/751 |
| 9,256,643 | B2 | 2/2016 | Alpers et al. |
| 10,423,644 | B1* | 9/2019 | Leach ............... G06F 16/24542 |
| 10,452,463 | B2* | 10/2019 | Hiran .................... G06F 11/079 |
| 2005/0192937 | A1 | 9/2005 | Barsness et al. |
| 2009/0216718 | A1* | 8/2009 | Agrawal ........... G06F 16/24549 |
| 2011/0302583 | A1* | 12/2011 | Abadi ................. G06F 16/2471 |
| | | | 718/102 |
| 2012/0054175 | A1* | 3/2012 | Barsness ............ G06F 16/2455 |
| | | | 707/719 |
| 2013/0073513 | A1* | 3/2013 | Kemper .................. G06F 16/28 |
| | | | 707/600 |
| 2014/0095525 | A1* | 4/2014 | Hsiao ................. G06F 16/9024 |
| | | | 707/759 |
| 2014/0380322 | A1* | 12/2014 | Ailamaki ................ G06F 9/505 |
| | | | 718/102 |
| 2015/0074037 | A1* | 3/2015 | Sarferaz ............... G06F 16/252 |
| | | | 707/602 |
| 2015/0074053 | A1* | 3/2015 | Sarferaz ............... G06F 16/283 |
| | | | 707/634 |
| 2016/0098425 | A1* | 4/2016 | Brunswig ............ G06F 16/254 |
| | | | 707/607 |
| 2016/0171070 | A1* | 6/2016 | Hrle .................... G06F 16/2379 |
| | | | 707/615 |
| 2016/0196163 | A1* | 7/2016 | van Gulik .............. G06F 16/23 |
| | | | 718/102 |
| 2017/0116275 | A1* | 4/2017 | Baggett ............... G06F 16/2462 |
| 2017/0213257 | A1* | 7/2017 | Murugesan ........ G06Q 30/0277 |
| 2018/0336246 | A1* | 11/2018 | Dasam ................ G06F 16/2453 |
| 2019/0026335 | A1* | 1/2019 | Gerweck ............ G06F 16/2457 |
| 2019/0197175 | A1* | 6/2019 | Purcell .................. G06F 16/284 |

OTHER PUBLICATIONS

Yannis E. Ioannidis, "Query Optimization," http://infolab.stanford.edu/~hyunjung/cs346/ioannidis.pdf, 1996, pp. 1-38.

Ql et al., "Threshold Query Optimization for Uncertain Data," http://orion.cs.purdue.edu/docs/thresholdQuery.pdf,, SIGMOD'10, Indianapolis, Indiana, U.S.A., Jun. 6-11, 2010, pp. 1-12.

Markl et al., Leo: An Autonomic Query Optimizer for DBS, IBM Systems Journal, vol. 42, Issue No. 1, 2003, pp. 98-106.

Oracle, "Optimizer with Oracle Database 12c Release 2," Oracle White Paper, Jun. 2017, pp. 1-29.

Ramakrishnan et al., "VGrADS: Enabling e-Science Workflows on Grids and Clouds with Fault Tolerance," SC09, Portland, Oregon, U.S.A., Nov. 14-20, 2009, pp. 1-12.

Seneviratne et al., "A Survey on Methodologies for Runtime Prediction on Grid Environments," 7th International Conference on Information and Automation for Sustainability (ICIAfS), Colombo, Sri Lanka, Dec. 22-24, 2014, pp. 1-6.

De Mello et al., "Grid Job Scheduling using Route with Genetic Algorithm Support," Telecommunication Systems, vol. 38, Issue 3-4, Aug. 2008, pp. 147-160, see Abstract provided.

Elmroth et al., "Three Complementary Performance Prediction Methods for Grid Applications," Jan. 2008, pp. 1-12.

Jin et al., "A Dataflow Model for .NET-based Computing Systems," GCA 2007: Proceedings of the 3rd International Workshop on Grid Computing and Applications, Biopolis, Singapore, Jun. 5-8, 2007, pp. 1-11.

Gao et al., "Reduct Algorithm Based Execution Times Prediction in Knowledge Discovery Cloud Computing Environment," The International Arab Journal of Information Technology, vol. 11, No. 3, May 2014, pp. 268-275.

Warren Smith, "Prediction Services for Distributed Computing," International Parallel and Distributed Processing Symposium, Rome, Italy, Mar. 26-30, 2007 pp. 1-10.

Smith et al., "Using Run-Time Predictions to Estimate Queue Wait Times and Improve Scheduler Performance," Workshop on Job Scheduling Strategies for Parallel Processing, 1999, pp. 202-219.

Kemper et al., "HyPer: A Hybrid OLTP&OLAP Main Memory Database System Based on Virtual Memory Snapshots," 2011 IEEE 27th International Conference on Data Engineering, 2011, pp. 195-206.

Sukhwani et al., "Database Analytics: A Reconfigurable-Computing Approach," IEEE Micro, vol. 34, Issue 1, Jan./Feb. 2014, pp. 19-29.

Lu et al., "A Unified OLAP/OLTP Big Data Processing Framework in Telecom Industry," 2016 16th International Symposium on Communications and Information Technologies (ISCIT), 2016, pp. 290-295.

Arora et al., "Janus: A Hybrid Scalable Multi-Representation Cloud Datastore," IEEE Transactions on Knowledge and Data Engineering, vol. PP, Issue 99, 2017, pp. 1-14.

Nam et al., "A Hybrid Flash Memory SSD Scheme for Enterprise Database Applications," 2010 12th International Asia-Pacific Web Conference, 2010, pp. 39-44.

* cited by examiner

OPTIMIZING QUERY PROCESSING AND ROUTING IN A HYBRID WORKLOAD OPTIMIZED DATABASE SYSTEM

TECHNICAL FIELD

The present invention relates generally to database systems, and more particularly to optimizing query processing and routing in a hybrid workload optimized database system.

BACKGROUND

Traditional database systems process certain types of workloads better than other types of workloads. For example, some database systems process online transaction processing (OLTP) workloads efficiently with minimal resource usage. However, such database systems (e.g., OLTP optimized database system) may process analytical workloads less efficiently using an excessive amount of resources (e.g., processor usage). On the other hand, some database systems (e.g., analytics optimized database system) may process analytical workloads efficiently using a limited amount of resources but may process OLTP workloads less efficiently using an excessive amount of resources. In another example, some in-memory databases perform may process both OLTP and analytical workloads efficiently; however, such databases are limited to processing a small amount of data due to the high cost of memory.

Recently, a database system, commonly referred to as a hybrid workload optimized database system (or simply "hybrid database system"), combines the strengths of the OLTP optimized database system and the analytics optimized database system. These two systems are seamlessly integrated so that to the outside user the integration is totally transparent. The analytics workload optimized database system is configured as an internal component of the hybrid database system. The analytics workload optimized database system serves as an accelerator of the hybrid database system where a workload, such as a long running analytical workload, is automatically routed to the accelerator to be processed. At times though analytical workloads may be more efficiently processed in the OLTP optimized database system, such as due to a large number of queries waiting to be processed by the accelerator. Similarly, there may be times when OLTP workloads may be more efficiently processed by the accelerator. As a result, a routing decision (decision whether or not to route the query to the accelerator to be processed) needs to be made.

Since the routing decision needs to be made before the query is actually executed, a challenge arises as to how the hybrid database system determines what workload to route over to the accelerator.

Currently, in handling the routing decision, the approach is to calculate the estimated cost based on a list of heuristic rules and the optimizer cost model. The estimated cost predicts how long it will take to execute the query in the OLTP optimized database system. The estimated cost is then compared with a fixed cost threshold (e.g., 5 seconds) to determine whether it is optimal to route the query to the accelerator.

Unfortunately, there are drawbacks to such an approach. For example, the heuristic rule and optimizer cost can often be imprecise, especially when the user query is complicated. The query is sometimes estimated to have a very low cost when it actually takes a long time to execute. Consequently, a long running query may be mistakenly kept in the OLTP optimized database system or in the analytics optimized database system.

Furthermore, a fixed threshold may not reflect real time scenarios. For example, even though the accelerator may be able to execute the query quickly, it may turn out that there are many queries waiting to be processed by the accelerator. In such a scenario, even though the query might be processed slower in the OLTP optimized database system, it may still be a better place to execute the query due to the wait time to be processed by the accelerator.

Hence, there is not currently a means for efficiently processing queries in hybrid database systems by effectively determining which internal database system will process the queries using a minimal amount of resources.

SUMMARY

In one embodiment of the present invention, a computer-implemented method for processing queries in a hybrid database system comprises receiving a query to be processed. The method further comprises estimating an execution time of the query by an online transaction processing engine, where the online transaction processing engine comprises a database engine that functions to process online transaction processing workloads. The method additionally comprises estimating an execution time of the query by a database accelerator, where the database accelerator comprises a database engine that functions to process analytical workloads. Furthermore, the method comprises determining a wait time for the database accelerator to process the query. Additionally, the method comprises determining whether the online transaction processing engine or the database accelerator will process the query using the estimated execution time of the query by the online transaction processing engine, the estimated execution time of the query by the database accelerator and the wait time for the database accelerator to process the query.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for processing queries in a hybrid database system. In one embodiment of the present invention, a database management system of the hybrid database system obtains an estimated execution time of a query by an online transaction processing engine. The database management system further obtains an estimated execution time of the query by a database accelerator. Furthermore, the database management system determines a wait time (which could be zero) for the database accelerator to process the query. The database management system then determines whether the online transaction processing engine or the database accelerator will process the query using the estimated execution time of the query by the online transaction processing engine, the estimated execution time of the query by the database accelerator and the wait time (which could be zero) for the database accelerator to process the query. In this manner, the present invention optimizes the processing of queries in hybrid database systems by effectively determining which internal database system (online transaction processing engine or the database accelerator) will process the queries using a minimal amount of resources.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with a hybrid database system that consists of an online transaction processing engine and a database accelerator engine, the principles of the present invention may be applied to other hybrid database systems with different types of database engines processing different types of workloads. A person of ordinary skill in the art would be capable of applying the principles of the present invention to such implementations. Further, embodiments applying the principles of the present invention to such implementations would fall within the scope of the present invention.

Figure 1:
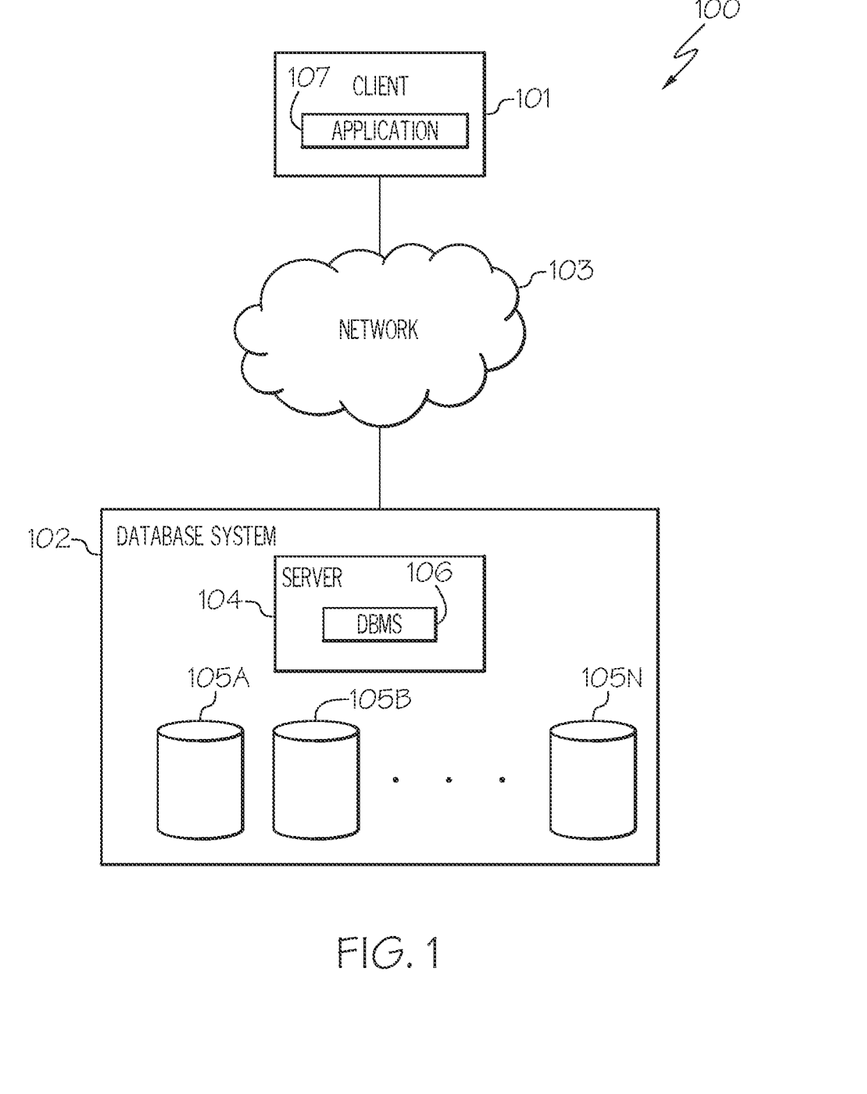
FIG. 1 illustrates a communication system configured in accordance with an embodiment of the present invention.

Referring now to the Figures in detail, FIG. 1 illustrates a communication system 100 configured in accordance with an embodiment of the present invention. System 100 includes a client device 101 (or simply "client") connected to a database system 102 via a network 103. Client 101 may be any type of computing device (e.g., a portable computing unit, a Personal Digital Assistant (PDA), a smartphone, a laptop computer, a mobile phone, a navigation device, a game console, a desktop computer system, a workstation, an Internet appliance and the like) configured with the capability of connecting to network 103 and consequently communicating with database system 102. In one embodiment, client 101 generates database queries to be processed by database system 102. After processing the queries, database system 102 returns the query results to client 101, such as via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Database system 102 contains a server (or referred to as "database server") 104 holding one or more databases 105A-105N (where N can be any positive integer number). Databases 105A-105N may collectively or individually be referred to as databases 105 or database 105, respectively. In one embodiment, database system 102 is a hybrid workload optimized database system (or simply referred to as a "hybrid database system"). As discussed further below, hybrid database system 102 utilizes both an online transaction processing engine and a database accelerator.

As illustrated in FIG. 1, server 104 contains a database management system 106 (identified as "DBMS" in FIG. 1) configured with the capability of maintaining and managing the data stored in databases 105. A description of the internal components of database management system 106 is provided below in connection with FIG. 2. Furthermore, a description of an embodiment of a hardware configuration of server 104 is provided below in connection with FIG. 3.

Furthermore, as shown in FIG. 1, client 101 includes an application 107 to perform various storage-related operations (e.g., create, retrieve, update, delete) on the data stored in databases 105 that is managed by database management system 106. Such operations may be performed by the applications using SQL statements, such as insert (used to create data), select (used to retrieve data), update (used to update data) and delete (used to delete data). While FIG. 1 illustrates client 101 including a single application, the present invention is not to be limited in scope to such a depiction. Client 101 may include any number of applications 107 configured to perform storage-related operations on the data stored in databases 105 that is managed by database management system 106.

FIG. 1 is intended to represent a typical environment at a high level of generality, and is not intended to represent all components of an environment in detail, or all possible permutations of an environment for accessing a database. Numerous variations of the environmental representation of FIG. 1 are possible, of which the following in particular are possible, the description of particular variations herein being intended by way of example only and not by way of limitation. For example, embodiments of the present invention discussed herein may be implemented in several environments, including a cloud environment. Furthermore, although client 101 and database system 102 are shown as separate and distinct entities, some or all of these may in fact be combined. In another example, system 100 may include any number of clients 101, database systems 102, networks 103, servers 104, databases 105 and database management systems 106. For example, while a single server 104 is shown in database system 102, database system 102 may include multiple servers 104.

Figure 2:
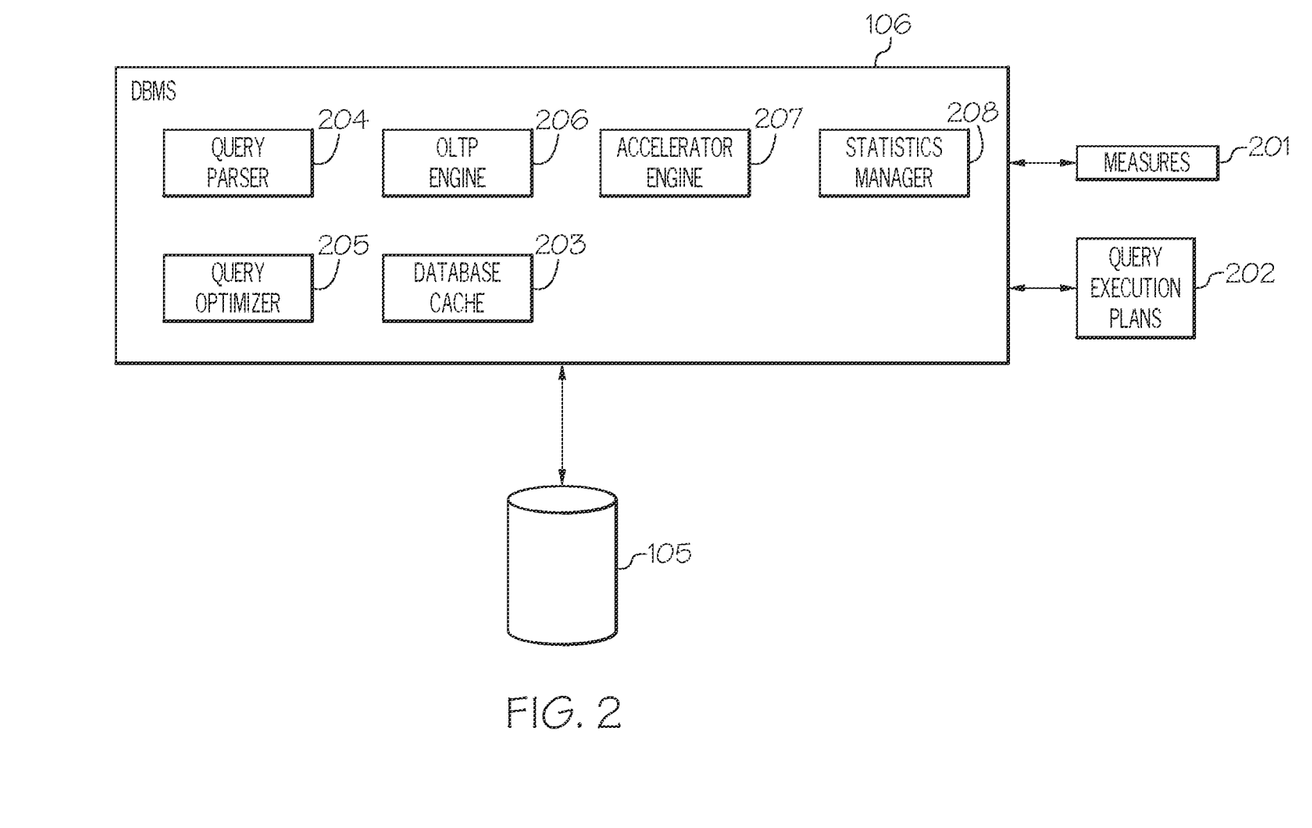
FIG. 2 is a block diagram illustrating the components of the database management system in accordance with an embodiment of the present invention.

Referring now to FIG. 2, in conjunction with FIG. 1, FIG. 2 is a block diagram illustrating the components of database management system 106 in accordance with an embodiment of the present invention. As discussed above, a client application, such as application 107, may issue a database query to database management system 106 and receive query results responsive to the database query. To generate the query results, database management system 106 may generate measures 201 and query execution plans 202.

In one embodiment, database 105 is representative of any collection of data, regardless of the particular physical representation of the data. A physical representation of data defines an organizational schema of the data. By way of illustration, database 105 may be organized according to a relational schema, accessible by Structured Query Language (SQL) queries, or according to an Extensible Markup Language (XML) schema, accessible by XML queries. However, embodiments of the present invention are not limited to a particular schema and contemplate extension to schemas presently unknown. As used herein, the term "schema" generically refers to a particular arrangement of data.

In one embodiment, database 105 stores database tables that include data pages. Each data page is configured to store data rows that, in turn, store information. The database table may also include a database index for logically ordering the data rows. The database index includes index pages. Each index page is configured to store index entries, where each data row is referenced by a corresponding index entry. The data pages and the index pages are arranged to be stored on and retrieved from storage.

In one embodiment, application 107 issues a request to database management system 106, where the request includes a query statement, e.g., select, insert, or update. Depending on the embodiment, the request issued by application 107 may be predefined (e.g., hard coded as part of application 107), or may be generated in response to input, such as user input.

In one embodiment, to service the request from application 107, database management system 106 performs a number of database operations. For example, database management system 106 retrieves index entries and data rows from storage into a database cache 203, which may reside in main memory. The speed of accessing the storage may be much slower than other operations involved in servicing a request, such as operations involving database cache 203. Consequently, performance of database management system 106 in servicing the request may be, to a large extent, determined by a frequency with which database management system 106 accesses the storage. Accordingly, in one embodiment, database management system 106 may manage which data objects reside in database cache 203 to improve performance of database management system 106 and requesting applications.

As shown in FIG. 2, the components of database management system 106 include a query parser 204, a query optimizer 205, an OLTP database engine (also simply referred to as "OLTP engine") 206, a database accelerator engine (also simply referred to as "accelerator engine" or "database accelerator") 207 and a statistics manager 208. Database management system 106 may interact with application 107 or a user by receiving query statements from application 107 or the user. The query statements may result in retrieval of data stored in database 105.

In one embodiment, upon receiving a query statement, query parser 204 parses the received query statement. Parsing the query statement may involve checking for correct syntax according to a query language specification associated with database management system 106. For example, query parser 204 may create input tokens from a sequence of characters in the received query statement and generate a data structure based on the input tokens. Examples of the data structure include a parse tree, an abstract syntax tree, etc. Depending on the embodiment, a separate lexical analyzer may be used to create the input tokens from a sequence of characters in the received query statement.

In one embodiment, prior to the query statement being executed, query optimizer 205 optimizes the query statement. In one embodiment, optimizing the query statement involves determining whether the query statement will be processed by OLTP engine 206 or database accelerator 207. OLTP engine 206, as used herein, refers to a database engine that primarily functions to process OLTP workloads (e.g., transaction-oriented data, such as from order entry, retail sales and financial transaction systems). Database accelerator 207, as used herein, refers to a database engine that primarily functions to process analytical workloads (e.g., large and complex queries traversing large number of rows). The process for determining whether the query statement (or simply "query") will be processed by OLTP engine 206 or database accelerator 207 is discussed below in connection with FIGS. 4 and 5A-5B. In connection with determining whether the query will be processed by OLTP engine 206 or database accelerator 207, query optimizer 205 may utilize the estimated execution time of the query by OLTP engine 206 and the estimated executed time of the query by database accelerator 207. Query optimizer 205 may further utilize the wait time for database accelerator 207 to process the query. In situations where the query was not previously executed by OLTP engine 206 and/or database accelerator 207, the estimated query execution time by the database engines is estimated using heuristic rules and cost modeling as discussed below.

Furthermore, as discussed further below, the "sensitivity" of the query to filtering changes is determined by query optimizer 205. "Sensitivity," as used herein, refers to the extent that changes in the literal values would result in changing as to which database engine (OLTP engine 206 or database accelerator 207) would process the query. A highly sensitive query could easily be processed by a different database engine based on a minor adjustment in the literal values. Conversely, a slightly sensitive query would not easily be processed by a different database engine unless there were major adjustments in the literal values. "Literal values," as used herein, refer to a fixed data value. For example, "JACK" is a character literal and 5001 is a numeric literal. In one embodiment, query optimizer 205 determines the sensitivity based on adjusting the literal values and then determining whether or not the changes to the literal values result in a change as to which database engine (OLTP engine 206 or database accelerator 207) processes the query. In one embodiment, the changes in the literal values result in a change in the estimated execution time of the query by the database engines (OLTP engine 206 or database accelerator 207), where the estimation is based on comparing previously monitored (and saved) execution times of similar queries with similar literal values processed by the database engines. In one embodiment, such information may be stored in database cache 203. In one embodiment, a score is generated based on how easily the query will be processed by a different database engine based on adjustments in the literal values. The score is then compared with a threshold value (may be user-specified) to determine whether the query is deemed to be "sensitive" to filtering changes. In one embodiment, if the score exceeds the threshold value, then the query is deemed to be sensitive to filtering changes. Otherwise, the query is deemed to not be sensitive to filtering changes.

An example of a SQL statement that is and is not sensitive to filtering changes is discussed below.

Assume index IDX1 (BIRTHDATE).
Example 1
SELECT COUNT(*)
FROM TABLE
WHERE BIRTHDATE<?;
Example 2
SELECT COUNT(*)
FROM TABLE
WHERE AGE=?;

For example 1, there is an index that matches the WHERE clause predicate. As filtering improves, it is likely that OLTP engine 206 will process the query more efficiently (utilize fewer resources, such as processing resources) than database accelerator 207—for example with literal WHERE BIRTHDATE<'1910-01-01'. As the filtering becomes worse, database accelerator 207 may perform best WHERE BIRTHDATE<'2017-01-01'. As a result, this query would then be marked sensitive to filtering changes by query optimizer 205.

For example 2, there is no available index on AGE and thus the available access path choice on the OLTP system (OLTP engine 206) is a table scan. The performance of this query will be consistent on the OLTP system regardless of the filtering of the predicate. As a result, this query would not be marked sensitive to filtering by query optimizer 205.

In rare situations where the literal values of the query statement are not known, but the query is deemed to be "sensitive," the estimated query execution time by the database engines (OLTP engine 206 and database accelerator 207) is estimated using heuristic rules and cost modeling as discussed below.

In one embodiment, optimizing the query statement may involve determining how tables addressed by the query statement are accessed. As a result of optimizing the query statement, query optimizer 205 may determine an access plan from the data structure created by query parser 204, where the access plan specifies how tables addressed by the query statement are accessed. In other words, the output of the query optimization process is an access plan. The access plan may include, in a proprietary form specific to the query optimizer/DBMS, low-level information specifying precisely what steps database engines 206, 207 should take and in what order, to execute the query statement. The access plan may also include an estimate by query optimizer 205 of how long it may take for database engines 206, 207 to execute the query statement in accordance with the access plan.

In one embodiment, query optimizer 205 may determine the access plan in the following manner. Query optimizer 205 may utilize heuristic rules and/or cost modeling to determine the access plan. For example, in utilizing heuristic rules, query optimizer 205 generates an access plan based on predefined rules. The rules may be defined by a database administrator to specify how an access plan is generated from a query statement. These rules, for example, may relate to creating or using indices or may relate to how join statements are performed, e.g., join orders, join algorithms, etc. At least in some cases, the more skillful the user is in specifying the rules, the better the resulting access plan may perform. "Cost modeling," involves using information on multiple alternative ways that a query statement may be converted into an access plan. Query optimizer 205 determines an estimated cost for executing each alternative access plan. Query optimizer 205 then determines the access plan having the lowest estimated cost.

In one embodiment, the database engine (OLTP engine 206 or database accelerator 207) executes the query statement using the access plan generated by query optimizer 205. The database engine retrieves and processes the data for the query statement. The access plan includes a list of instructions to be executed by the database engine. The list of instructions specifies access methods to be used, data objects to be created, and system resources to be acquired. The database engine may also specify which data objects from database 105 are to remain in database cache 203.

In one embodiment, database cache 203 may be arranged as a buffer pool, and stores/retrieves data and index pages from database 105. Data pages may correspond to physical blocks of storage that contains database 105. Depending on the embodiment, database management system 106 may also include a media manager (not shown) that communicates with the storage via I/O operations addressing the physical blocks, and a cache manager (not shown) may interface with the media manager to store and retrieve data. In some embodiments, the cache manager and/or media manager may use operating system functions to store and retrieve data and to thereby manage database cache 203. These operating system functions may be part of an application programming interface (API) provided by the operating system.

In one embodiment, database cache 203 includes a collection of frames. Each frame may store a data page from database 105, as the data page is brought in from storage to memory. Each data page stored in database cache 105 may include a property indicating whether the respective data page is pinned. Depending on the embodiment, the property may be a Boolean or an integer value. A pinned data page indicates to the cache manager (not shown) that the pinned data page in the frame of database cache 203 should not be replaced with another data page. An unpinned data page indicates to the cache manager that the unpinned data page in the frame of database cache 203 may be replaced with another data page. The cache manager may also apply an algorithm—such as the least recently used (LRU) algorithm—to determine which data pages in database cache 203 should be replaced with data pages subsequently retrieved from disk.

In one embodiment, statistics manager 208 performs statistical analysis on data objects stored in database 105, to determine structures of the data objects and distributions of data values in the data objects.

Figure 3:
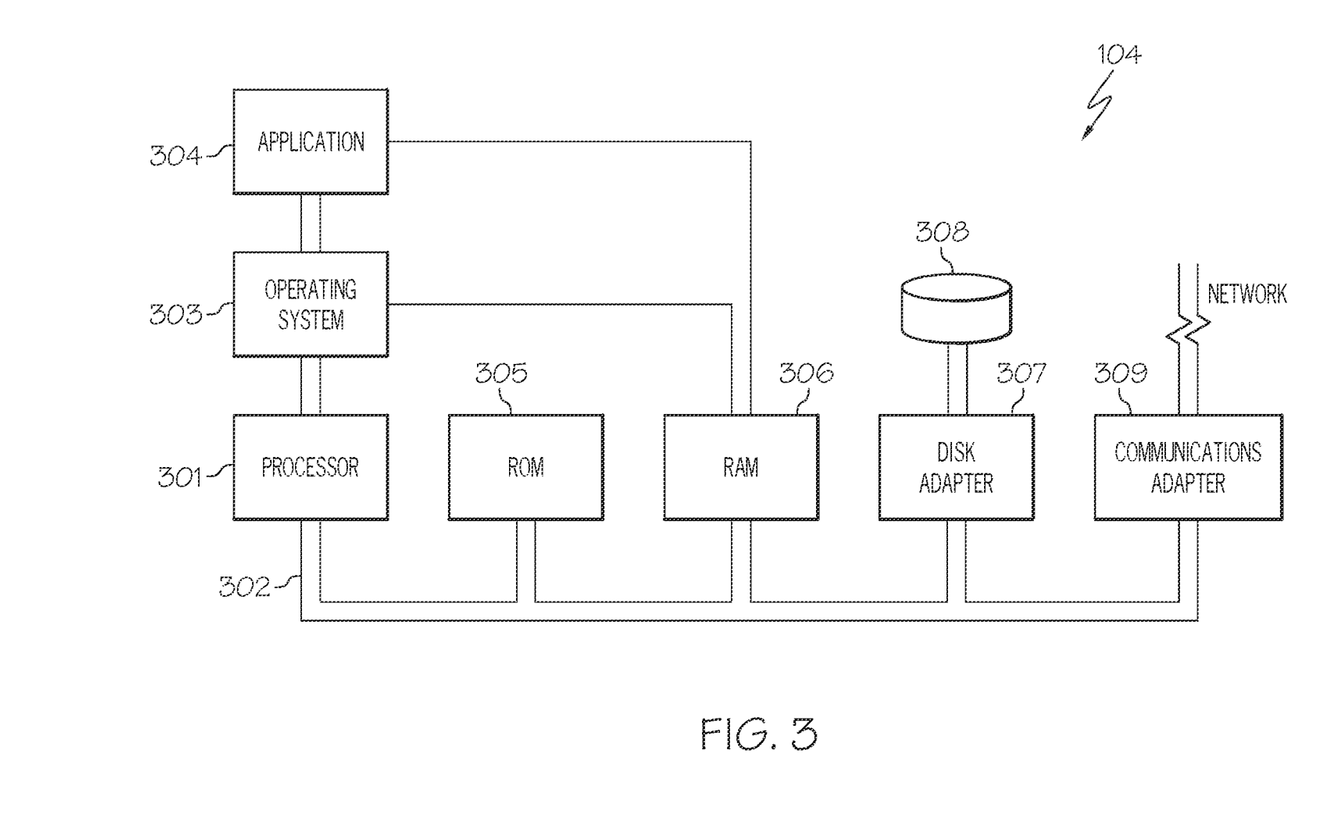
FIG. 3 illustrates an embodiment of the present invention of a hardware configuration of the server which is representative of a hardware environment for practicing the present invention.

Referring now to FIG. 3, FIG. 3 illustrates an embodiment of the present invention of a hardware configuration of server 104 (FIG. 1) which is representative of a hardware environment for practicing the present invention. Referring to FIG. 3, server 104 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, database management system 106, including query optimizer 205, configured to determine which internal database system (e.g., OLTP engine 206 or accelerator engine 207) will process the queries using a minimal amount of resources as discussed further below in connection with FIGS. 4 and 5A-5B.

Referring again to FIG. 3, read-only memory ("ROM") 305 is coupled to system bus 302 and includes a basic input/output system ("BIOS") that controls certain basic functions of server 104. Random access memory ("RAM") 306 and disk adapter 307 are also coupled to system bus 302. It should be noted that software components including operating system 303 and application 304 may be loaded into RAM 306, which may be server's 104 main memory for execution. Disk adapter 307 may be an integrated drive electronics ("IDE") adapter that communicates with a disk unit 308, e.g., disk drive. It is noted that the program for determining which internal database system (e.g., OLTP engine 206 or accelerator engine 207) will process the queries using a minimal amount of resources, as discussed further below in connection with FIGS. 4 and 5A-5B, may reside in disk unit 308 or in application 304.

Server 104 further includes a communications adapter 309 coupled to bus 302. Communications adapter 309 interconnects bus 302 with an outside network (e.g., network 103 of FIG. 1) thereby allowing server 104 to communicate with other devices, such as client 101 (FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, in handling the routing decision (decision whether or not to route the query to the accelerator to be processed), the approach is to calculate the estimated cost based on a list of heuristic rules and the optimizer cost model. The estimated cost predicts how long it will take to execute the query in the OLTP optimized database system. The estimated cost is then compared with a fixed cost threshold (e.g., 5 seconds) to determine whether it is optimal to route the query to the accelerator. Unfortunately, there are drawbacks to such an approach. For example, the heuristic rule and optimizer cost can often be imprecise, especially when the user query is complicated. The query is sometimes estimated to have a very low cost when it actually takes a long time to execute. Consequently, a long running query may be mistakenly kept in the OLTP optimized database system or in the analytics optimized database system. Furthermore, a fixed threshold may not reflect real time scenarios. For example, even though the accelerator may be able to execute the query quickly, it may turn out that there are many queries waiting to be processed by the accelerator. In such a scenario, even though the query might be processed slower in the OLTP optimized database system, it may still be a better place to execute the query due to the wait time to be processed by the accelerator. Hence, there is not currently a means for efficiently processing queries in hybrid database systems by effectively determining which internal database system will process the queries using a minimal amount of resources.

Figure 4:
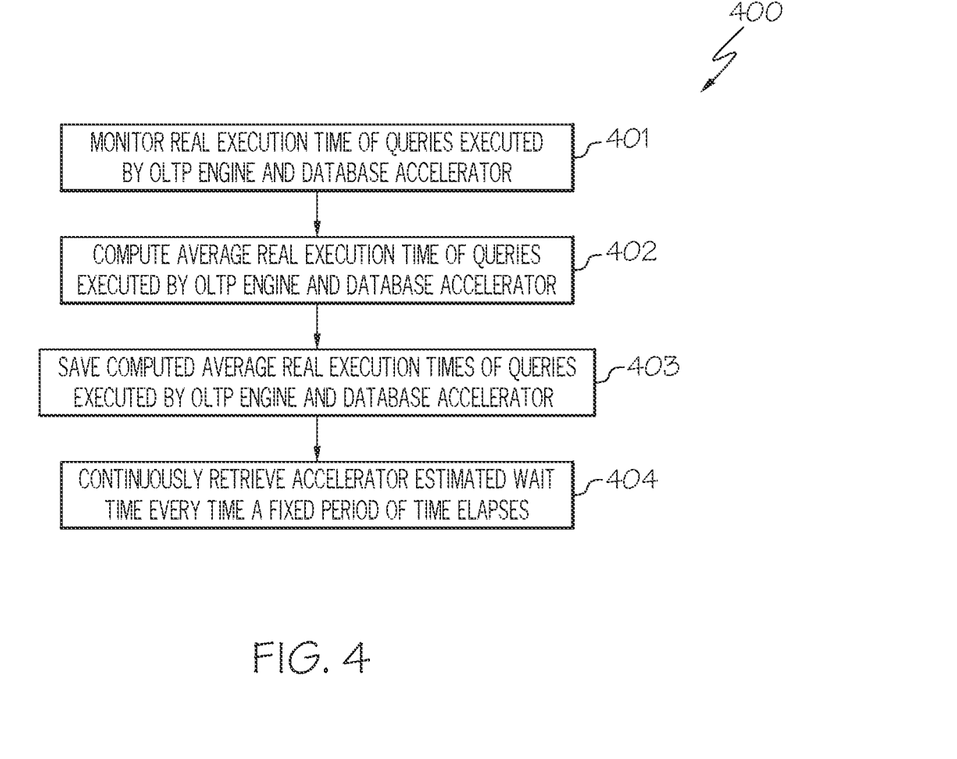
FIG. 4 is flowchart of a method for monitoring the execution times of queries processed by the OLTP engine and the database accelerator as well as the wait times for processing queries by the database accelerator in accordance with an embodiment of the present invention.
Figure 5A:
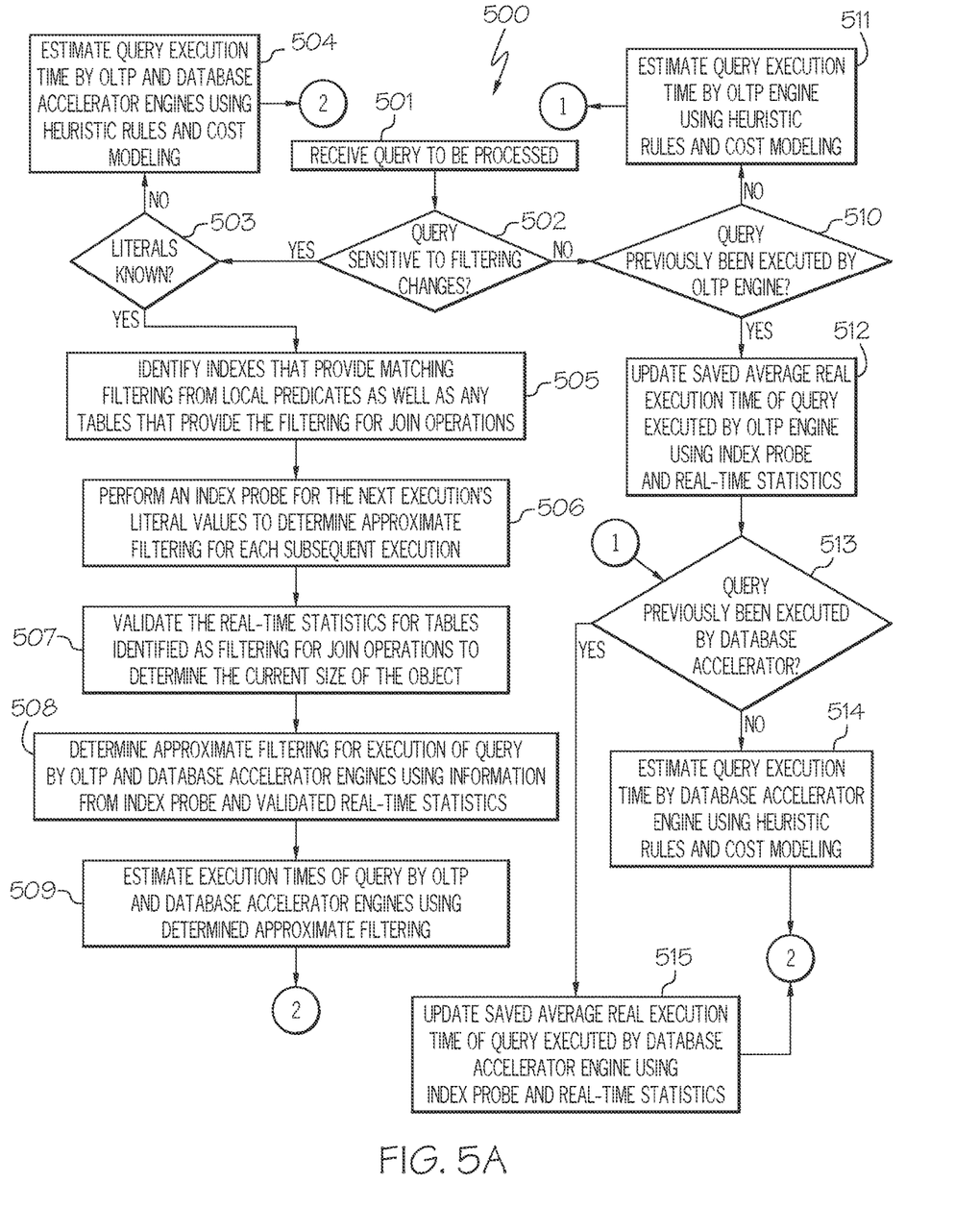
FIGS. 5A-5B are a flowchart of a method for determining whether the OLTP engine or the database accelerator will process the query in accordance with an embodiment of the present invention.
Figure 5B:
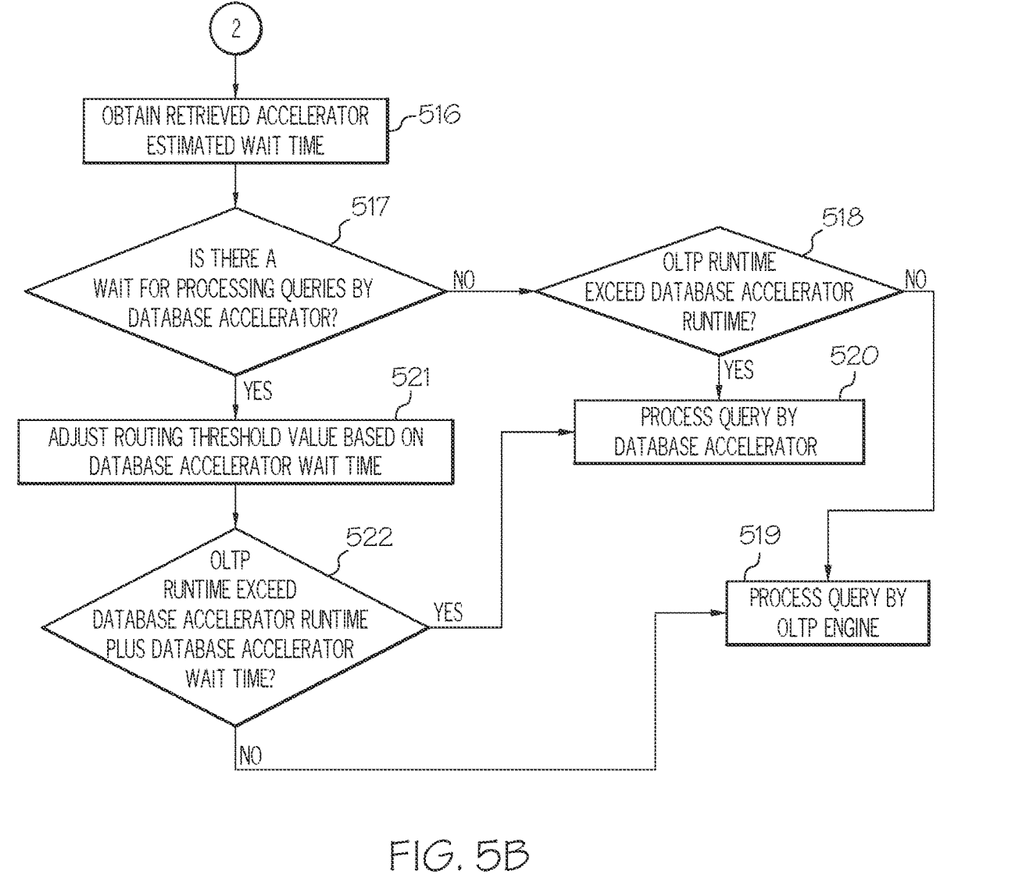

The principles of the present invention provide a means for effectively determining which internal database system (OLTP optimized database system or the database accelerator) will process the queries using a minimal amount of resources as discussed below in connection with FIGS. 4 and 5A-5B. FIG. 4 is flowchart of a method for monitoring the execution times of queries processed by OLTP engine 206 and database accelerator 207 as well as the wait times for processing queries by database accelerator 207. FIGS. 5A-5B are a flowchart of a method for determining whether OLTP engine 206 or database accelerator 207 will process the query.

As discussed above, FIG. 4 is a flowchart of a method 400 for monitoring the execution times of queries processed by OLTP engine 206 and database accelerator 207 as well as the wait times for processing queries by database accelerator 207 in accordance with an embodiment of the present invention.

Referring to FIG. 4, in conjunction with FIGS. 1-3, in step 401, database management system 106, such as query optimizer 205, monitors the real execution time of queries executed by OLTP engine 206 and database accelerator 207.

In step 402, database management system 106, such as query optimizer 205, computes the average real execution time of queries executed by OLTP engine 206 and database accelerator 207. In one embodiment, query optimizer 205 computes the average real execution time of queries executed by OLTP engine 206 and database accelerator 207 over a period of time, which may be user-selected.

In step 403, database management system 106, such as query optimizer 205, saves the computed average real execution times of queries executed by OLTP engine 206 and database accelerator 207. In one embodiment, in addition to saving the average real execution times of these queries by the database engines, various information about these queries, such as predicates, literals, etc. are also saved. In one embodiment, such information is saved in database cache 203. In one embodiment, by saving such information, query optimizer 205 is configured to assess the sensitivity of newly received queries from client 101 by comparing the newly received queries to similar queries with similar predicates, literals, etc. and then deducing a likely execution time for processing these newly received queries by OLTP engine 206 and database accelerator 207 based on the stored average real execution times of executing the similar queries.

In step 404, database management system 106, such as query optimizer 205, continuously retrieves the accelerator estimated wait time every time a fixed period of time (e.g., twenty seconds) elapses. The "accelerator estimated wait time," as used herein, refers to the delay in processing a query by database accelerator 207. In one embodiment, the accelerator estimated wait time is retrieved every time a fixed period of time (e.g., twenty (20) seconds) elapses through heartbeat messages between the two database engines (OLTP engine 206 and database accelerator 207).

Using such information, query optimizer 205 determines whether OLTP engine 206 or database accelerator 207 will process a newly received query as discussed below in connection with FIGS. 5A-5B.

FIGS. 5A-5B are a flowchart of a method 500 for determining whether OLTP engine 206 or database accelerator 207 will process the query in accordance with an embodiment of the present invention.

Referring to FIG. 5A, in conjunction with FIGS. 1-4, in step 501, database management system 106 receives a query from client 101 to be processed.

In step 502, database management system 106, such as query optimizer 205, determines whether the query is deemed to be "sensitive" to filtering changes. A discussion regarding determining whether the query is deemed to be "sensitive" to filtering changes was previously discussed and hence will not be reiterated herein for the sake of brevity.

If the query is deemed to be "sensitive" to filtering changes, then, in step 503, a determination is made by database management system 106, such as query optimizer 205, as to whether the literals of the query statement are known.

If the literals of the query statement are not known, then, in step 504, database management system 106, such as query optimizer 205, estimates the query execution time by OLTP engine 206 and database accelerator 207 using heuristic rules and cost modeling as discussed above.

If, however, the literals of the query statement are known, then, in step 505, database management system 106, such as query optimizer 205, identifies the indexes that provide matching filtering from local predicates as well as any tables that provide filtering for join operations. In one embodiment, "matching filtering," as used herein, refers to identifying indexes that provide match filtering from local predicates. For example, in a matching index scan, predicates are specified on either the leading or all of the index key columns. These predicates provide filtering; only specific index pages and data pages need to be accessed. A "table that provides filtering" or a "filtered table," as used herein, refers to tables that only store and maintain rows of data that match the filter predicate. The "join operation," as used herein, refers to the join clause that combines columns from one or more tables in a relational database. A join operation is used as a means for combining columns from one (self-join) or more tables by using values common to each. Hence, a table that provides filtering for join operations is a table that only stores and maintains rows of data that match the filter predicate involving the join operation.

In step 506, database management system 106, such as query optimizer 205, performs an index probe for the next execution's literal values to determine approximate filtering for each subsequent execution. In one embodiment, the index probe is used to search indexes using the next execution's literal values to determine the approximate filtering of each index. "Approximate filtering," as used herein, refers to estimating the amount of data filtered from each index.

In step 507, database management system 106, such as query optimizer 205, validates the real-time statistics (real execution times of query executed by OLTP and accelerator engines 206, 207 identified and saved by query optimizer 205 as discussed above in FIG. 4) for tables identified as filtering for join operations (see step 505) to determine the current size of the object (representing table). That is, the validated real-time statistics are used to find the size information for such tables.

In step 508, database management system 106, such as query optimizer 205, determines the approximate filtering for execution of the query by OLTP engine 206 and database accelerator 207 using information from the index probe and validated real-time statistics.

In step 509, database management system 106, such as query optimizer 205, estimates the execution times of the query by OLTP engine 206 and database accelerator 207 using the determined approximate filtering. In one embodiment, historical information related to the execution times of the query by OLTP engine 206 and database accelerator 207 obtained from the stored execution times discussed above in connection with FIG. 4 are grouped into filtering ranges. Using the estimated or approximate filtering, the appropriate historical execution times grouped by filtering ranges will be selected. The estimated executed times of the query by OLTP engine 206 and database accelerator 207 will then be determined based on the selected historical execution times.

Referring now to step 502, if, however, the query is deemed to not be "sensitive" to filtering changes, then, in step 510, a determination is made by database management system 106, such as query optimizer 205, as to whether the query had previously been executed by OLTP engine 206.

If the query had not previously been executed by OLTP engine 206, then, in step 511, database management system 106, such as query optimizer 205, estimates the query execution time by OLTP engine 206 using heuristic rules and cost modeling as discussed above.

If, however, the query had previously been executed by OLTP engine 206, then, in step 512, database management system 106, such as query optimizer 205, updates the saved average real execution time of the query executed by OLTP engine 206 using the index probe and real-time statistics as discussed above in connection with steps 505-509.

Upon executing step 511 or step 512, in step 513, a determination is made by database management system 106, such as query optimizer 205, as to whether the query had previously been executed by database accelerator 207.

If the query had not previously been executed by database accelerator 207, then, in step 514, database management system 106, such as query optimizer 205, estimates the query execution time by database accelerator 207 using heuristic rules and cost modeling as discussed above.

If, however, the query had previously been executed by database accelerator 207, then, in step 515, database management system 106, such as query optimizer 205, updates the saved average real execution time of the query executed by database accelerator 207 using the index probe and real-time statistics as discussed above in connection with steps 505-509.

Referring now to FIG. 5B, in conjunction with FIGS. 1-4, upon executing steps 504, 509, 514 or 515, in step 516, database management system 106, such as query optimizer 205, obtains the retrieved accelerator estimated wait time (see step 404 of FIG. 4).

In step 517, a determination is made by database management system 106, such as query optimizer 205, as to whether there is a wait for processing queries by database accelerator 207. That is, a determination is made as to whether the retrieved accelerator estimated wait time is non-zero.

If, there is not a wait for processing queries by database accelerator 207 (i.e., the retrieved accelerator wait time is zero), then, in step 518, a determination is made by database management system 106, such as query optimizer 205, as to whether the OLTP runtime exceeds the database accelerator runtime. That is, a determination is made as to whether the estimated execution time of the query by OLTP engine 206 exceeds the estimated execution time of the query by database accelerator 207.

If the estimated execution time of the query by OLTP engine 206 does not exceed the estimated execution time of the query by database accelerator 207, then, in step 519, the query is processed by OLTP engine 206. In one embodiment, query optimizer 205 instructs OLTP engine 206 to process the query in response to the estimated execution time of the query by OLTP engine 206 not exceeding the estimated execution time of the query by database accelerator 207.

If, however, the estimated execution time of the query by OLTP engine 206 exceeds the estimated execution time of the query by database accelerator 207, then, in step 520, the query is processed by database accelerator 207. In one embodiment, query optimizer 205 instructs database accelerator 207 to process the query in response to the estimated execution time of the query by OLTP engine 206 exceeding the estimated execution time of the query by database accelerator 207.

If, however, there is a wait for processing queries by database accelerator 207 (i.e., the retrieved accelerator wait time is non-zero), then, in step 521, database management system 106, such as query optimizer 205, adjusts the routing threshold value based on the database accelerator wait time. As a result, the routing threshold is dynamic. The routing threshold dynamically adjusts based on the database accelerator wait time. The "routing threshold value," as used herein, refers to the value used to compare with the estimated execution time of the query by OLTP engine 206 to determine whether OLTP engine 206 or database accelerator 207 will process the query. As previously discussed, when the wait time for processing queries by database accelerator 207 is zero, then the routing threshold value is equal to the estimated execution time of the query by database accelerator 207. If, however, there is a wait time for processing queries by database accelerator 207, then the routing threshold value is equal to the estimated execution time of the query by database accelerator 207 plus the wait time.

In step 522, a determination is made by database management system 106, such as query optimizer 205, as to whether the OLTP runtime exceeds the database accelerator runtime plus the database accelerator wait time. That is, a determination is made as to whether the estimated execution time of the query by OLTP engine 206 exceeds the estimated execution time of the query by database accelerator 207 plus the database accelerator wait time.

If the estimated execution time of the query by OLTP engine 206 does not exceed the estimated execution time of the query by database accelerator 207 plus the database accelerator wait time, then, in step 519, the query is processed by OLTP engine 206. In one embodiment, query optimizer 205 instructs OLTP engine 206 to process the query in response to the estimated execution time of the query by OLTP engine 206 not exceeding the estimated execution time of the query by database accelerator 207 plus the database accelerator wait time.

If, however, the estimated execution time of the query by OLTP engine 206 exceeds the estimated execution time of the query by database accelerator 207 plus the database accelerator wait time, then, in step 520, the query is processed by database accelerator 207. In one embodiment, query optimizer 205 instructs database accelerator 207 to process the query in response to the estimated execution time of the query by OLTP engine 206 exceeding the estimated execution time of the query by database accelerator 207 plus the database accelerator wait time.

In this manner, the present invention optimizes the processing of queries in hybrid workload optimized database systems by effectively determining which internal database system (OLTP engine or the database accelerator) will process the queries using a minimal amount of resources.

As previously discussed, currently, such systems handle the routing decision (decision whether or not to route the query to the accelerator to be processed) by calculating the estimated cost based on a list of heuristic rules and the optimizer cost model. The estimated cost predicts how long it will take to execute the query in the OLTP optimized database system. The estimated cost is then compared with a fixed cost threshold (e.g., 5 seconds) to determine whether it is optimal to route the query to the accelerator. Unfortunately, there are drawbacks to such an approach. For example, the heuristic rule and optimizer cost can often be imprecise, especially when the user query is complicated. The query is sometimes estimated to have a very low cost when it actually takes a long time to execute. Consequently, a long running query may be mistakenly kept in the OLTP optimized database system or in the analytics optimized database system. Furthermore, a fixed threshold may not reflect real time scenarios. For example, even though the accelerator may be able to execute the query quickly, it may turn out that there are many queries waiting to be processed by the accelerator. In such a scenario, even though the query might be processed slower in the OLTP optimized database system, it may still be a better place to execute the query due to the wait time to be processed by the accelerator. Hence, there is not currently a means for efficiently processing queries in hybrid database systems by effectively determining which internal database system will process the queries using a minimal amount of resources.

The present invention improves the technology or technical field involving database systems, such as hybrid workload optimized database systems, by providing a technological solution to the technical problem discussed above by effectively determining which internal database system will process the queries using a minimal amount of resources. In this manner, resources are more efficiently utilized, such as processing resources. By utilizing resource more efficiently, the capabilities, including functional capabilities, of hybrid workload optimized database systems are improved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for processing queries in a hybrid database system, the method comprising:
   receiving a query to be processed;
   estimating an execution time of said query by an online transaction processing engine, wherein said online transaction processing engine comprises a database engine that functions to process online transaction processing workloads;
   estimating an execution time of said query by a database accelerator, wherein said database accelerator comprises a database engine that functions to process analytical workloads;
   determining a wait time for said database accelerator to process said query via heartbeat messages between said online transaction processing engine and said database accelerator, wherein said wait time corresponds to a delay in processing said query by said database accelerator, wherein said wait time for said database accelerator to process said query is retrieved every time a fixed period of time elapses through said heartbeat messages between said online transaction processing engine and said database accelerator; and
   determining whether said online transaction processing engine or said database accelerator will process said query using said estimated execution time of said query by said online transaction processing engine, said estimated execution time of said query by said database accelerator and said wait time for said database accelerator to process said query.

2. The method as recited in claim 1 further comprising:
   processing said query by said online transaction processing engine in response to said estimated execution time of said query by said online transaction processing engine not exceeding said estimated execution time of said query by said database accelerator plus said wait time for said database accelerator to process said query.

3. The method as recited in claim 1 further comprising:
   processing said query by said database accelerator in response to said estimated execution time of said query by said online transaction processing engine exceeding said estimated execution time of said query by said database accelerator plus said wait time for said database accelerator to process said query.

4. The method as recited in claim 1, wherein said wait time for said database accelerator to process said query is zero, wherein said query is processed by said online transaction processing engine in response to said estimated execution time of said query by said online transaction processing engine not exceeding said estimated execution time of said query by said database accelerator, wherein said query is processed by said database accelerator in response to said estimated execution time of said query by said online transaction processing engine exceeding said estimated execution time of said query by said database accelerator.

5. The method as recited in claim 1 further comprising:
identifying indexes that provide match filtering from local predicates as well as identifying tables that provide filtering for join operations; and
performing an index probe for next execution's literal values to determine approximate filtering for each subsequent execution.

6. The method as recited in claim 5 further comprising:
validating real-time statistics for tables identified as filtering for join operations to determine a current size of object; and
determining an approximate filtering for execution of said query by said online transaction processing engine and said database accelerator using information from said index probe and said validated real-time statistics.

7. A computer program product for processing queries in a hybrid database system, the computer program product comprising one or more computer readable storage mediums having program code embodied therewith, the program code comprising programming instructions for:
receiving a query to be processed;
estimating an execution time of said query by an online transaction processing engine, wherein said online transaction processing engine comprises a database engine that functions to process online transaction processing workloads;
estimating an execution time of said query by a database accelerator, wherein said database accelerator comprises a database engine that functions to process analytical workloads;
determining a wait time for said database accelerator to process said query via heartbeat messages between said online transaction processing engine and said database accelerator, wherein said wait time corresponds to a delay in processing said query by said database accelerator, wherein said wait time for said database accelerator to process said query is retrieved every time a fixed period of time elapses through said heartbeat messages between said online transaction processing engine and said database accelerator; and
determining whether said online transaction processing engine or said database accelerator will process said query using said estimated execution time of said query by said online transaction processing engine, said estimated execution time of said query by said database accelerator and said wait time for said database accelerator to process said query.

8. The computer program product as recited in claim 7, wherein the program code further comprises the programming instructions for:
processing said query by said online transaction processing engine in response to said estimated execution time of said query by said online transaction processing engine not exceeding said estimated execution time of said query by said database accelerator plus said wait time for said database accelerator to process said query.

9. The computer program product as recited in claim 7, wherein the program code further comprises the programming instructions for:
processing said query by said database accelerator in response to said estimated execution time of said query by said online transaction processing engine exceeding said estimated execution time of said query by said database accelerator plus said wait time for said database accelerator to process said query.

10. The computer program product as recited in claim 7, wherein said wait time for said database accelerator to process said query is zero, wherein said query is processed by said online transaction processing engine in response to said estimated execution time of said query by said online transaction processing engine not exceeding said estimated execution time of said query by said database accelerator, wherein said query is processed by said database accelerator in response to said estimated execution time of said query by said online transaction processing engine exceeding said estimated execution time of said query by said database accelerator.

11. The computer program product as recited in claim 7, wherein the program code further comprises the programming instructions for:
identifying indexes that provide match filtering from local predicates as well as identifying tables that provide filtering for join operations; and
performing an index probe for next execution's literal values to determine approximate filtering for each subsequent execution.

12. The computer program product as recited in claim 11, wherein the program code further comprises the programming instructions for:
validating real-time statistics for tables identified as filtering for join operations to determine a current size of object; and
determining an approximate filtering for execution of said query by said online transaction processing engine and said database accelerator using information from said index probe and said validated real-time statistics.

13. A system, comprising:
a memory for storing a computer program for processing queries in a hybrid database system; and
a processor connected to said memory, wherein said processor is configured to execute program instructions of the computer program comprising:
receiving a query to be processed;
estimating an execution time of said query by an online transaction processing engine, wherein said online transaction processing engine comprises a database engine that functions to process online transaction processing workloads;
estimating an execution time of said query by a database accelerator, wherein said database accelerator comprises a database engine that functions to process analytical workloads;
determining a wait time for said database accelerator to process said query via heartbeat messages between said online transaction processing engine and said database accelerator, wherein said wait time corresponds to a delay in processing said query by said database accelerator, wherein said wait time for said database accelerator to process said query is retrieved every time a fixed period of time elapses through said heartbeat messages between said online transaction processing engine and said database accelerator; and
determining whether said online transaction processing engine or said database accelerator will process said query using said estimated execution time of said query by said online transaction processing engine, said estimated execution time of said query by said database accelerator and said wait time for said database accelerator to process said query.

14. The system as recited in claim 13, wherein the program instructions of the computer program further comprise:
    processing said query by said online transaction processing engine in response to said estimated execution time of said query by said online transaction processing engine not exceeding said estimated execution time of said query by said database accelerator plus said wait time for said database accelerator to process said query.

15. The system as recited in claim 13, wherein the program instructions of the computer program further comprise:
    processing said query by said database accelerator in response to said estimated execution time of said query by said online transaction processing engine exceeding said estimated execution time of said query by said database accelerator plus said wait time for said database accelerator to process said query.

16. The system as recited in claim 13, wherein said wait time for said database accelerator to process said query is zero, wherein said query is processed by said online transaction processing engine in response to said estimated execution time of said query by said online transaction processing engine not exceeding said estimated execution time of said query by said database accelerator, wherein said query is processed by said database accelerator in response to said estimated execution time of said query by said online transaction processing engine exceeding said estimated execution time of said query by said database accelerator.

17. The system as recited in claim 13, wherein the program instructions of the computer program further comprise:
    identifying indexes that provide match filtering from local predicates as well as identifying tables that provide filtering for join operations; and
    performing an index probe for next execution's literal values to determine approximate filtering for each subsequent execution.

18. The system as recited in claim 17, wherein the program instructions of the computer program further comprise:
    validating real-time statistics for tables identified as filtering for join operations to determine a current size of object; and
    determining an approximate filtering for execution of said query by said online transaction processing engine and said database accelerator using information from said index probe and said validated real-time statistics.

* * * * *